(12) United States Patent
Lehmann et al.

(10) Patent No.: US 8,965,987 B2
(45) Date of Patent: Feb. 24, 2015

(54) ACTION NOTIFICATION FOR BUSINESS APPLICATIONS

(75) Inventors: Doron Lehmann, Kfar Vradim (IL); Eyal Nathan, Tel-Aviv (IL); Nimrod Barak, Tel-Aviv (IL)

(73) Assignee: SAP AG, a German Corporation, Walldorf (DE)

( * ) Notice: Subject to any disclaimer, the term of this patent is extended or adjusted under 35 U.S.C. 154(b) by 152 days.

(21) Appl. No.: 13/595,268

(22) Filed: Aug. 27, 2012

(65) Prior Publication Data

US 2014/0059144 A1  Feb. 27, 2014

(51) Int. Cl.
*G06F 15/16* (2006.01)

(52) U.S. Cl.
USPC .......................................................... 709/206

(58) Field of Classification Search
USPC .......................................................... 709/206
See application file for complete search history.

(56) References Cited

U.S. PATENT DOCUMENTS

| 7,984,417 B2 | 7/2011 | Ben-Zvi et al. | |
|---|---|---|---|
| 2006/0271997 A1* | 11/2006 | Jacoby et al. | 725/135 |
| 2007/0168874 A1* | 7/2007 | Kloeffer et al. | 715/764 |
| 2013/0081008 A1* | 3/2013 | Rangarajan et al. | 717/168 |

* cited by examiner

*Primary Examiner* — Tu Nguyen
(74) *Attorney, Agent, or Firm* — Fish & Richardson P.C.

(57) ABSTRACT

The present disclosure describes methods, systems, and computer program products for generating action notifications for business applications. One computer-implemented method includes receiving notification data from a plurality of data sources; determining, based upon the received notification data, at least one action item to perform with an application on a client device; generating, by a notification engine, an application notification event, wherein the application notification event includes a unified list of at least one determined action item applicable to a user and a particular client device associated with the user; and transmitting the generated application notification event to the client device.

20 Claims, 3 Drawing Sheets

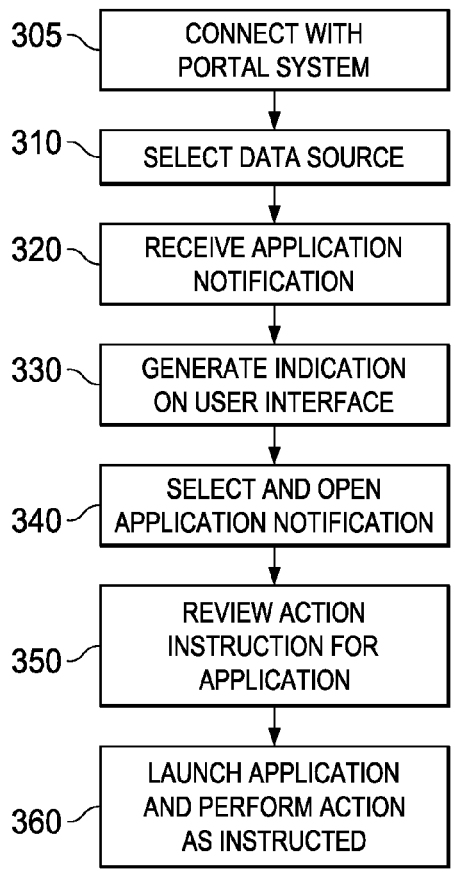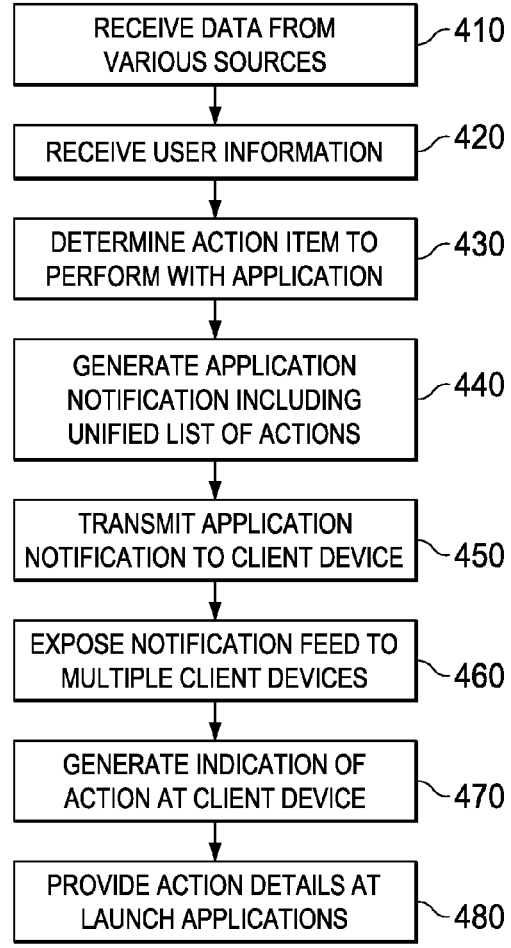

ACTION NOTIFICATION FOR BUSINESS APPLICATIONS

BACKGROUND

An application, application software, or app is a computer program installed into a native operating system of a computing device to perform a particular function for a user or another application, such as entertainment, word processing, communications, image editing, network browsing, media playback/recording, and the like. Computing devices typically running applications include smart phones, tablet computers, notebook computers, and desktop computers. In some instances, a business application for a mobile electronic device can be connected to a portal system environment. The portal system can provide a secure, unified access point, often in the form of a web-based user interface (e.g., a web portal realized using an internet browser on a computing device), using various applications. Often a user is not aware of actions that need to be taken in the portal system environment using applications available to the user and/or which applications to use to perform required actions. This lack of knowledge affects potential efficiency gains available through the use of a portal.

SUMMARY

The present disclosure relates to methods, systems, and computer-readable media for sending notifications with action items for applications. One computer-implemented method includes receiving notification data from a plurality of data sources; determining, based upon the received notification data, at least one action item to perform with an application on a client device; generating, by a notification engine, an application notification event, wherein the application notification event includes a unified list of at least one determined action item applicable to a user and a particular client device associated with the user; and transmitting the generated application notification event to the client device.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features:

A first aspect, combinable with the general implementation, includes processing a received application notification event to generate an indication of the at least one determined action item to be performed with the application, wherein the indication is displayed on a graphical user interface.

In a second aspect, combinable with any of the previous aspects, wherein generating the indication includes providing details associated with a particular action item of the at least one determined action item including a URL, wherein a selection of the URL launches the application.

In a third aspect, combinable with any of the previous aspects, wherein the generated indication includes at least one of a pop-up balloon, a dropdown list, or a pop-up window.

In a fourth aspect, combinable with any of the previous aspects, wherein the generated indication includes at least one of an SMS message, or a calendar reminder message.

In a fifth aspect, combinable with any of the previous aspects, wherein the generated indication includes at least one of audio or video.

A sixth aspect, combinable with any of the previous aspects, includes exposing a particular user's notification feed to a plurality of client devices using various communication protocols, wherein each client device can process received application notification events according to client device specific parameters.

In a seventh aspect, combinable with any of the previous aspects, wherein the notification engine receives input from a suggestion service collecting data from other users having a similar profile as a particular user and the notification engine recommends to the particular user to use a particular application that the other users are using.

In an eighth aspect, combinable with any of the previous aspects, wherein the plurality of data sources are limited by selecting particular data sources from the plurality of data sources.

The subject matter described in this specification can be implemented in particular implementations so as to realize one or more of the following advantages. With a growing number of applications designed and developed for various mobile platforms, users can be notified of required actions associated with applications. Users may also be actively notified that an application is necessary to perform required tasks and/or presented with an opportunity to download the required application. Users may also have applications suggested to them to use in order to perform required tasks.

While generally described as computer-implemented software embodied on tangible and non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 illustrates an example method for receiving application notification on a mobile device.

FIG. 4 illustrates an example method for providing application notification from a portal system perspective.

DETAILED DESCRIPTION

This specification describes methods, systems, and computer-readable media for providing an application notification service. With a growing number of applications designed and developed for various mobile platforms, users often face a general challenge of knowing about required responses to various applications. For example, users may be required to launch a particular application to even discover required actions for the particular application as the required actions may be posted within the application. In a case of receiving a request from an employee, for example a vacation request, a manager may need to launch an approval application to discover the request, view, and respond to the request. This may not be efficient if the manager is engaged with other projects or work, and the manager is not aware a request has been generated to draw the attention of the manager to the particular application. In this scenario, the request could be pending for an extended period of time, lowering overall operational efficiency. In a second scenario, a user may be required to actively install a particular application or have a choice of efficient applications available to fulfill certain responsibilities. The user may not be aware of the required application or all available applications may not make the best use of available resources. This may impact the user's efficiency compared to peers in similar roles.

Figure 1:
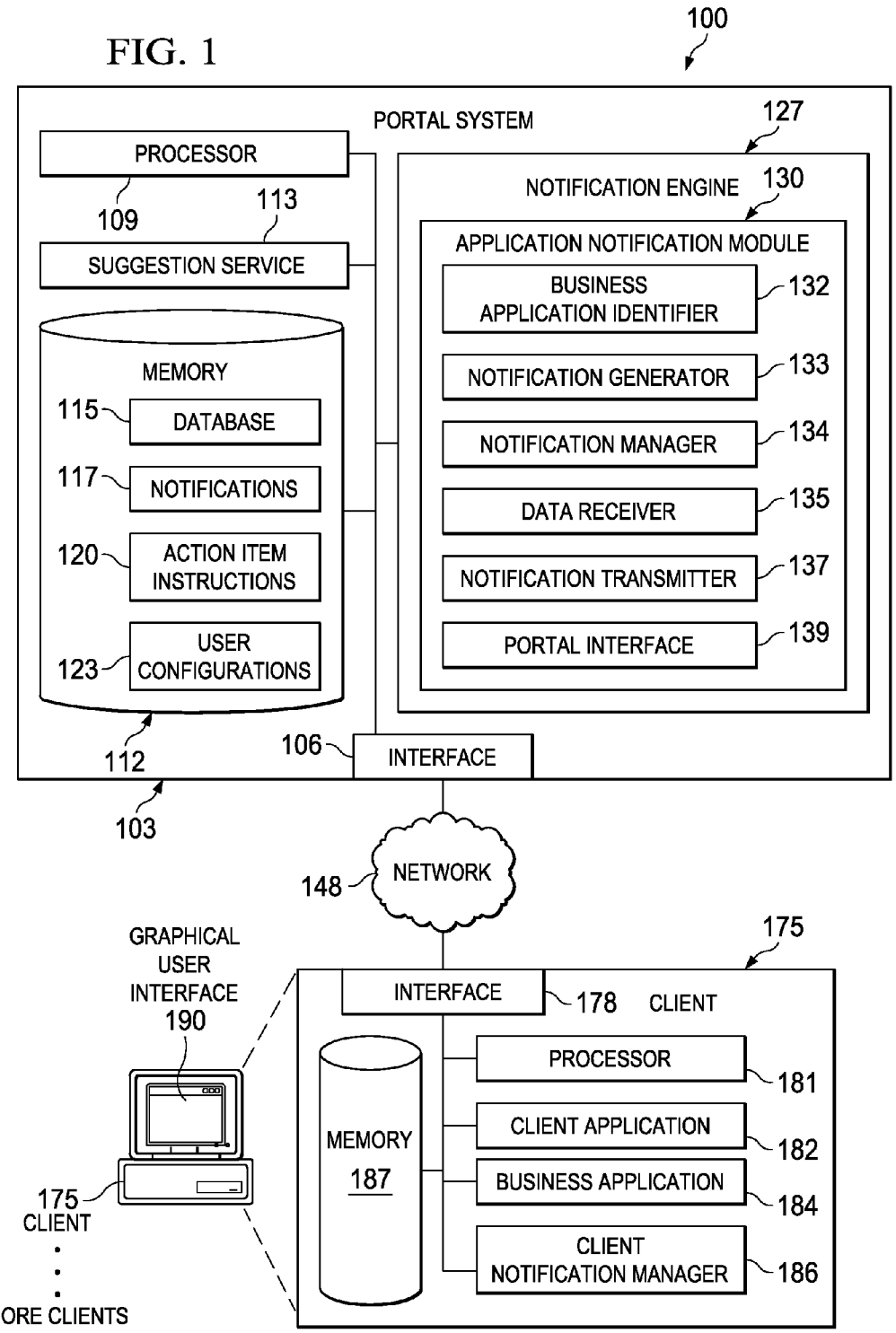
FIG. 1 illustrates an example environment for implementing various features of a portal system providing application notification service.

An application notification engine can be provided to actively push notifications containing action items for and/or about applications, inform the user of action items requiring a user's attention, and provide an efficient way to execute the corresponding action items. At a high level, the application notification engine can be incorporated within a portal system which is connected with a client device. The portal system can identify business applications available on a particular client device and generate a record of the available business applications linked to with a unique identifier associated with the particular client device. The portal system can also identify, generate, and store a record of available business applications not installed on the particular client device. The portal system can receive or retrieve data from the available business applications, as well as data related to the available business applications. For example, a request may be sent to a business application to form a record of the request within the portal system allowing the portal system to generate application notification events for the business application containing action items and instructions for users related to the business application. The portal system may receive data from multiple business applications and generate application notification events applicable to all the business applications. The application notification events can include action items, some of which are applicable to a particular user and one or more of the client devices associated with the user. The action items associated with the application notification events may be indicated with a pop-up window, dialog box, notification indicator, or other attention-grabbing type of user interface. The user may launch a particular business application associated with the application notification event directly in a pop-up window (or other associated interface) and also have an associated action item automatically opened in the just launched application. This enables efficient interaction with applications FIG. 1 illustrates an example environment for implementing various features of a portal system providing an application notification service. The illustrated example environment 100 includes, or is communicably coupled with, a client 175, and a portal system 103. At least some of the communications between the portal system 103 and the client 175 may be performed across or using network 148. In general, environment 100 depicts an example configuration of a system for providing a notification engine 127 on the portal system 103 to communicate with the client 175. The portal system 103 can also provide applications, processing functionality, and/or database resources to the client 175 (e.g., to support business application 184). In alternative implementations, the elements illustrated in FIG. 1 can be included in or associated with different and/or additional servers, clients, networks, and locations other than those illustrated. For example, there may be additional clients 175 sending messages to the portal system 103. As another example, multiple clients 175 may be connected to one or more servers similar to the portal system 103 to obtain various functionalities and services. In some implementations, one or more of the components illustrated within the portal system 103, the client 175, or any of the other illustrated components, can be located in multiple or different servers, cloud-based networks, or other locations accessible to the portal system 103 (e.g., either directly or indirectly using network 148).

At a high level, the portal system 103 can be connected with one or more clients such as the client 175. For example, the portal system 103 can host a portal system 103 that can communicate with the client 175. The portal system 103 can be displayed as a webpage at the client 175 using a client application 182 at the GUI 190. The portal system 103 may gather information from business applications 184 and send out application notifications using the portal system 103. The portal system 103 may receive data from the connected business applications 184 to generate action items in the notifications. For example, the portal system 103 can include a notification engine 127 to receive and/or retrieve data from a particular business application deployed in various systems. Multiple applications of the various systems can generate data in response to events being created. The generated data can be sent to the portal system 103 for processing and determination of action items to perform with some of the applications 184 on the client 175. The determined actions can be included in application notifications generated at the notification engine 127. In addition, a suggestion service 113 can provide a higher-level notification to the client to insure proper/sufficient business applications 184 are available at the client 175.

In the illustrated implementation of FIG. 1, the portal system 103 includes an interface 106, a processor 109, memory 112, the suggestion service 113, and the notification engine 127. The interface 106 is used by the portal system 103 to communicate with other systems in a client-server or other distributed environment (including within environment 100) connected to the network 148 (e.g., the client 175, as well as other systems communicably coupled to the network 148). The interface 106 generally includes logic encoded in software and/or hardware in a suitable combination and operable to communicate with the network 148. More specifically, the interface 106 may include software supporting one or more communication protocols associated with communications such that the network 148 or the interface hardware is operable to communicate physical signals within and outside of the illustrated environment 100.

The processor 109 can be any appropriate processing unit or units to enable computation in the portal system 103. Although illustrated as a single processor 109 in the portal system 103, two or more processors may be used in the portal system 103 according to particular needs, desires, or particular embodiments of environment 100. Generally, the processor 109 executes instructions and manipulates data to perform the operations of the portal system 103 and, specifically, the functionality associated with the corresponding notification engine 127 and/or suggestion service 113. In one implementation, the server's processor 109 executes the functionality required to receive inbound communications from and send outbound communications to the client 175, as well as the functionality required to perform the operations of the associated notification engine 127 and/or suggestion service 113.

The memory 112 of the illustrated portal system 103 stores at least a database 115, notifications 117, action item instructions 120, user configurations 123, and other data and program instructions. In some implementations, including a cloud-based system, some or all of the memory 112 may be stored remote from the portal system 103, and communicably coupled to the portal system 103 for usage. Specifically, the memory 112 can store the database 115 in support of the portal system 103, the notifications generated by the notification engine 127, the action item instructions 120 determined at the application notification module 130, and the user configurations 123 that record at least identification and/or configuration settings of client devices connected to the portal system 103. In some implementations, the user configurations 123 can also store a user profile, user role, and other information about a particular user or users. In some implementations, some or all of the elements illustrated within memory 112 may be stored externally to the memory 112.

At a high level, the notification engine 127 can be a framework for integrating information and processes across application boundaries and generating application notifications based on the integrated information and processes of a particular portal system 103. For example, the notification engine 127 can communicate with business applications to enable the display of notifications of action items that a user needs to perform with a particular business application. In some implementations, the notification engine 127 can be an extensible framework that polls information from multiple business applications and systems, and generates notification event whose associated action items should be displayed to the user. In particular, the notification engine 127 may be associated with one or more business processes that communicate with various users, applications, systems, and components to retrieve, receive, and process events. In some implementations, the notification engine 127 may operate in response to and in connection with one or more requests received from an associated client 175 or other remote client to generate notifications 117. Additionally, the notification engine 127 may operate in response to and/or in connection with one or more requests received from other applications external to the portal system 103. For example, the operation of the notification engine 127 to generate a notification 117 may be initiated by a request requiring actions from a particular client 175 and a particular application associated with the particular client 175. In some implementations, the notification engine 127 may communicate with one or more of the client applications 182. In some implementations, the client application 182 represents a web-based application, such as a browser, accessed and executed by remote clients 175 using the network 148 (e.g., through the Internet, or using one or more cloud-based services associated with the notification engine 127).

The notification engine 127 includes an application notification module 130 that enables the notification engine 127 to generate notifications for applications and determine action items associated with the application notification events. The notification engine 127 may include additional modules that are not illustrated in FIG. 1. The application notification module 130 can determine an action item associated with an application notification event, the action item including a compilation of instructions, information, links, and other responses determined to reply to various events sent from systems, business applications, and/or data sources. The application notification module 130 is communicatively connected to, using the portal system 103, various business applications such as the business applications 184, as well as other enterprise portal related applications, databases, web content, and networking information not illustrated in FIG. 1. The application notification module 130 includes at least a business application identifier 132, a notification generator 133, a notification manager 134, a data receiver 135, a notification transmitter 137, and a portal interface 139. In some implementations, the notification engine 127 can expose user's specific notification feed to numerous clients using different protocols, such as REST, SOAP, among others. Each client may implement the notifications according to the runtime device type, platform, and user settings.

The business application identifier 132 can identify business applications associated with connected clients 175. For example, when the client 175 connects with the portal system 103 using a secure sign-on or other authenticated method, the portal system 103 can authenticate the client 175 (e.g., allowing the client 175 to access a digital identity) and initiate the notification engine 127. The initiation of the notification engine 127 can retrieve client information on the portal system 103 as well as from the client 175. The business application identifier 132 can analyze the client 175 (e.g., by checking application registry of the operating system) and gather information relating to installed/available business applications applicable to the digital identity of the client 175 on the portal system 103. In some implementations, the business applications are designed to run on specific operating systems, such as IOS, ANDROID, LINUX, UNIX, and WINDOWS, among others. In some implementations, the business application identifier may identify business applications such as sales analysis, manager insight, electronic medical records, fact sheet, briefing, sales, business one, interview, and other business applications. The business application identifier 132 can obtain files related to the business application 184 and save data related to the business application 184 in database 115 of the memory 112. The database 115 can include operation parameters, data logging files, and other data applicable to the operation of the business application 184 as well as the portal system 103.

The notification generator 133 can process requests from connected business application 184 and determine the content included in the notifications 117. The generated notifications 117 can be saved in memory 112. The notification generator 133 can be coupled with the data receiver 135 to obtain data from various data sources. For example, the data receiver 135 can receive notification data from a number of data resources including systems, applications, and enterprise exchange systems. In some implementations, the notification data can include approval requests, schedule requests, meeting requests, response requests, and other types of requests associated with the specific function of the business applications. For example, a sales application may send an order request to a particular user for approval. The data receiver 135 receives the order request from the sales application. The notification generator 133 can use the application notification event data received at the data receiver 135 and determine a response action item to perform with a compatible sales application on the client device of the particular user. The notification generator 133 can further generate and/or compile a set of data including application notification event messages, a link to open the action item response in the compatible sales application, and instructions related to the response. In other implementations, many applications may send various requests to the particular user for responses. The notification generator 133 can also produce an application notification event containing action items, each action item corresponding to each of the application requests applicable to the particular user on a particular compatible client device associated with the particular user.

The notification generator 133 may include an analysis algorithm to interpret the application notification event data received at the data receiver 135 and to identify the related action item to perform with an application on a client device.

For example, the application notification event data may include order approval requests handled by sales applications, vacation approval requests handled by vacation applications, meeting scheduling requests handled by calendar applications, travel approval requests handled by travel applications, briefing confirmation requests handled by briefing applications, and other requests handled by specific applications. The analysis algorithm can recognize corresponding applications for each request and determine action item instructions 120 for users using a corresponding business application on the client device. The notification generator 133 can then compile the determined action item instructions 120 and contents of the application notification event data to form an application notification event message, which can include a URL to the business application on the client device for responding to the requests. For example, the application notification event message can include a statement describing content of the application notification event data, and a selectable item enabling users to launch a corresponding business application with an environment populated by/incorporating the action item (e.g., taking the user to an action item page/window to respond to the request where the action item page/window is populated with data associated with action item). The application notification event message can be saved in the notifications 117 in the memory 112, along with the action item instructions 120.

In some implementations, the data receiver 135 operates to retrieve data from various data sources. For example, the data receiver 135 can poll purchase orders from a supply chain management system. The retrieved purchase order data can then be used by the notification generator 133 to generate application notification events to users based on, for example, order statuses, approval requests, and parameters associated with the approval requests. In other instances, the data receiver 135 can retrieve application notification event data from various applications, such as multiple vacation request applications of multiple users. The retrieved data can be sent to the notification generator 133, which determines the corresponding users (e.g., approvers) to these requests and generates a list identifying responding actions, approvers, and the client device associated with the approvers. The application notification event can be determined based on other information available at the portal system 103, such as the role, responsibility, rank, authority, and other request related factors of the corresponding users.

The notification manager 134 can manage the application notification events generated at the notification generator 133. The notification manager 134 can determine, based on the target business application 184/client 175, a required form of application notification event. For example, the notification manager 134 can access the user configurations 123 to identify the device type of client 175. In some implementations, the client 175 can be a smartphone. In some implementations, the notification manager 134 can format the notifications 117 in a form of an SMS message. In other implementations, the notification manager 134 can format the notifications 117 for the device type of client 175. In addition to determining the format of the notifications 117, the notification manager 134 can manage notifications 117 based on parameters describing time priority, importance level, application version information, operating system platform, user authority, among others. For example, the notification manager 134 can prioritize the notifications 117 that have a shorter deadline or due date notification event list generated at the notification generator 133. Similarly, the notifications 117 responding to requests from a high-importance user may be highlighted in the application notification event list. The notification manager 134 can group notifications 117 applicable to the same application or the same operating system platform together. In some implementations, the notification manager 134 can filter certain notifications 117 from the application notification event list based on the authority level of the receiving user or client.

The notification transmitter 137 can transmit the notifications 117 to a receiving client, such as the client 175. The notification transmitter 137 may access information of the user configurations 123 at the memory 112 and determine if the notifications 117 are applicable to the business application 184 of the client 175. In some implementations, the notification transmitter 137 may detect the lack of a required business application, a newer version of the business application 184, or a different than required version of the business application 184. The notification transmitter 137 may transmit the notifications 117 along with business application update/downgrade information using the portal interface 139 informing the user to update/downgrade or to install the required version of the business application.

The portal interface 139 can enable the client 175 to interface with the notification engine 127 using the portal system 103. For example, the portal interface 139 can obtain metadata of the client 175. The metadata can include parameters describing the role, responsibility, authority level, and other aspects of the client 175. The metadata can play part in determining actions for the notification generator 133 and allow the notification engine 127 to communicate with the portal system 103. For example, an approval request may be sent to a committee including nine committee members for a democratic vote. The portal interface can integrate the notification engine 127 with and notify all the nine committee members using the portal system 103. In some implementations, the portal interface 139 can operate with the suggestion service 113 to include more notification content using the metadata obtained from the client 175. For example, the suggestion service 113 can use the metadata collected from the client 175 and the user configurations 123 to suggest applications to the client 175. The application suggestion can be combined with the notifications 117.

The suggestion service 113 can identify a group of clients (i.e., their digital identities) sharing certain common features (e.g., roles, responsibilities, job titles, customers, etc.) with the client 175. The suggestion service can identify the business applications available to and most popular among the group of clients and make suggestions to the client 175 about the business applications that are not used by the client 175. The suggestions may be sent to the application notification module 130 to create a stand-alone application notification event, or may be combined with any existing notifications 117 that can use the suggested business application.

The portal system 103 is any server or system that stores, manages, and executes functionality associated with the notification engine 127. Additionally, the portal system 103 may execute one or more notification engines 127. In some instances, each portal system 103 may store a plurality of various applications (not illustrated); while in other instances, the portal system 103 may be a dedicated server meant to store and execute the notification engine 127 for a particular platform or application and its related functionality. In some instances, the portal system 103 may include a web server or be communicably coupled with a web server, where one or more of the notification engines 127 associated with the portal system 103 represent web-based (or web-accessible) applications accessed and executed through requests and interactions received by the client 175, executing a business application 184 operable to interact with programmed tasks or one or more notification engines 127.

The portal system 103 can include an electronic computing device operable to receive, transmit, process, store, or manage data and information associated with the environment 100. The portal system 103 illustrated in FIG. 1 can be responsible for receiving application-related requests from one or more clients 175 (as well as any other entity or system interacting with the portal system 103, including desktop or mobile client systems), responding to the received requests by processing said requests in the associated notification engine 127, and sending the appropriate responses from the appropriate component back to the requesting client 175 or other requesting system. Components of the portal system 103 can also process and respond to local requests from a user locally accessing the portal system 103. Accordingly, in addition to requests from the client 175 illustrated in FIG. 1, requests associated with a particular component may also be sent from internal users, external or third-party customers, and other associated business applications, business processes, as well as other appropriate entities, individuals, systems, or computers. In some instances, the notification engine 127 or the business application 184 may be a web-based application executing functionality associated with a networked or cloud-based business process.

Referring now to the client 175 illustrated in FIG. 1, the client 175 may be any computing device operable to connect to or communicate with the portal system 103 using a wireline or wireless connection directly or using the network 148, or another suitable communication means or channel. In some instances, the client 175 may be a part of or associated with a business process involving one or more of a remote developer or user associated with the portal system 103, for example, the business application 184. It will be understood that there may be any number of clients 175 associated with, or external to, environment 100. For example, while illustrated environment 100 includes a single client 175, alternative implementations of environment 100 may include multiple sellers or customers communicably coupled to one or more of the systems illustrated. In some instances, one or more clients 175 may be associated with administrators of the environment, and may be capable of accessing and interacting with the settings and operations of one or more portal systems 103, and/or other components of the illustrated environment 100. Additionally, there may also be one or more additional clients 175 external to the illustrated portion of environment 100 capable of interacting with the environment 100 using the network 148.

The illustrated client 175 includes an interface 178, a processor 181, a client application 182, the business application 184, a client notification manager 186, and a memory 187. The interface 178 is used by the client 175 for communicating with other systems in a distributed environment—including within the example environment 100—connected to the network 148; for example, the portal system 103 as well as other systems communicably coupled to the network 148 (not illustrated). The interface 178 may also be consistent with the above-described interface 106 of the portal system 103 or other interfaces within the example environment 100. The processor 181 may be consistent with the above-described processor 109 of the portal system 103 or other processors within the example environment 100. Specifically, the processor 181 executes instructions and manipulates data to perform the operations of the client 175, including the functionality required to send requests to the portal system 103 and to receive and process responses from the portal system 103. The memory 187 may be consistent with the above-described memory 112 of the portal system 103 or other memories within the example environment 100 but storing objects and/or data associated with the purposes of the client 175.

Further, the representative client 175 illustrates a GUI 190 applicable to the client 175 in general. The GUI 190 provides a visual interface with at least a portion of the example environment 100. Generally, through the GUI 190, portal system 103 users are provided with an efficient and user-friendly presentation of data provided by or communicated within the example environment 100. For example, the GUI 190 may be associated with the client application 182 and used to view, navigate, and/or configure content of the portal system 103, navigation lists, and other associated content served by portal system 103. In some implementations, the client application 182 may be used to access various portions of the portal system 103. In some instances, the client application 182 may be an agent or client-side version of the portal system 103 or other suitable component of the portal system 103. In some other implementations, the GUI 109 may be associated with the business application 184 when the business application 184 is launched in response to a notification. The GUI 190 may present the information of the business application 184 for viewing and interaction with the notification.

The client notification manager 186 can manage notification indications on the GUI 190. For example, the client notification manager 186 can determine the form of notification presented to the user, such as a pop-up balloon, a list, a pop-up window/message, a combination of such, and other forms of presentations. In some implementations, the user may define what form of presentations to be used by the client notification manager 186, including notification history, retaining duration, and other parameters. In some implementations, the client notification manager 186 can interface with client application 182 to handle notifications sent as SMS messages or calendar reminder messages. In addition to managing notification indications, the client notification manager 186 can allow users to define which data source the user prefers to receive notifications from. For example, the user may be subject to receiving notification to multiple business applications but preferring only a subset of the multiple business applications. The user can define at the client notification manager 186 to receive notifications only from the subset of the multiple business applications.

As used in this disclosure, each client 175 is intended to encompass a personal computer, touch screen terminal, workstation, network computer, kiosk, wireless data port, smart phone, personal data assistant (PDA), one or more processors within these or other devices, or any other suitable processing device. For example, each client 175 may include a computer that includes an input device, such as a keypad, touch screen, mouse, or other device that can accept user information, and an output device that conveys information associated with the operation of one or more business applications 184, and/or the client 175 itself, including digital data, visual information, or the GUI 190. Both the input and output device may include fixed or removable storage media such as a magnetic storage media, CD-ROM, or other suitable media, to both receive input from and provide output to users of client 175 through the display, namely, the GUI 190. As previously stated, the client's processor 181, interface 178, and memory 187 may be similar to or different from those described in connection with the other components illustrated in FIG. 1, although alternative implementations of one or more of these components may be used, as well as implementations where additional components may also be included.

FIG. 1 depicts a client-server environment, but could also represent a cloud-computing network. Various other implementations of the illustrated environment 100 can be provided to allow for increased flexibility in the underlying system, including multiple application systems 103 performing or executing one or more additional or alternative instances of the notification engine 127 for one or more different platforms, as well as multiple instances of the notification engine 127 and its related functionality. In those instances, the different application systems 103 may communicate with each other using a cloud-based network or through the connections provided by network 148. Generally, the portal system 103 may be communicably coupled with the network 148 that facilitates wireless or wireline communications between the components of the environment 100 (i.e., between the portal system 103 and one or more clients 175), as well as with any other local or remote computer, such as additional clients, servers, or other devices communicably coupled to the network 148, including those not illustrated in FIG. 1. In the illustrated environment, the network 148 is depicted as a single network, but may be included in more than one network without departing from the scope of this disclosure, so long as at least a portion of the network 148 may facilitate communications between senders and recipients. In some instances, one or more of the components associated with the portal system 103 may be included within the network 148 as one or more cloud-based services or operations.

The network 148 may be all or a portion of an enterprise or secured network, while in another instance, at least a portion of the network 148 may represent a connection to the Internet. In the illustrated example, at least a portion of the network 148 includes a portion of a cellular or mobile data network or other network capable of relaying SMS messages. In some instances, a portion of the network 148 may be a virtual private network (VPN). Further, all or a portion of the network 148 can include either a wireline or wireless link. Example wireless links may include 802.11/b/g/n, 802.20, WIMAX, and/or any other appropriate wireless link. In other words, the network 148 encompasses any internal or external network, networks, sub-network, or combination thereof operable to facilitate communications between various computing components inside and outside the illustrated environment 100. The network 148 may communicate with, for example, Internet Protocol (IP) packets, Frame Relay frames, Asynchronous Transfer Mode (ATM) cells, voice, video, data, and other suitable information between network addresses. The network 148 may also include one or more local area networks (LANs), radio access networks (RANs), metropolitan area networks (MANs), wide area networks (WANs), all or a portion of the Internet, and/or any other communication system or systems at one or more locations.

Figure 2:
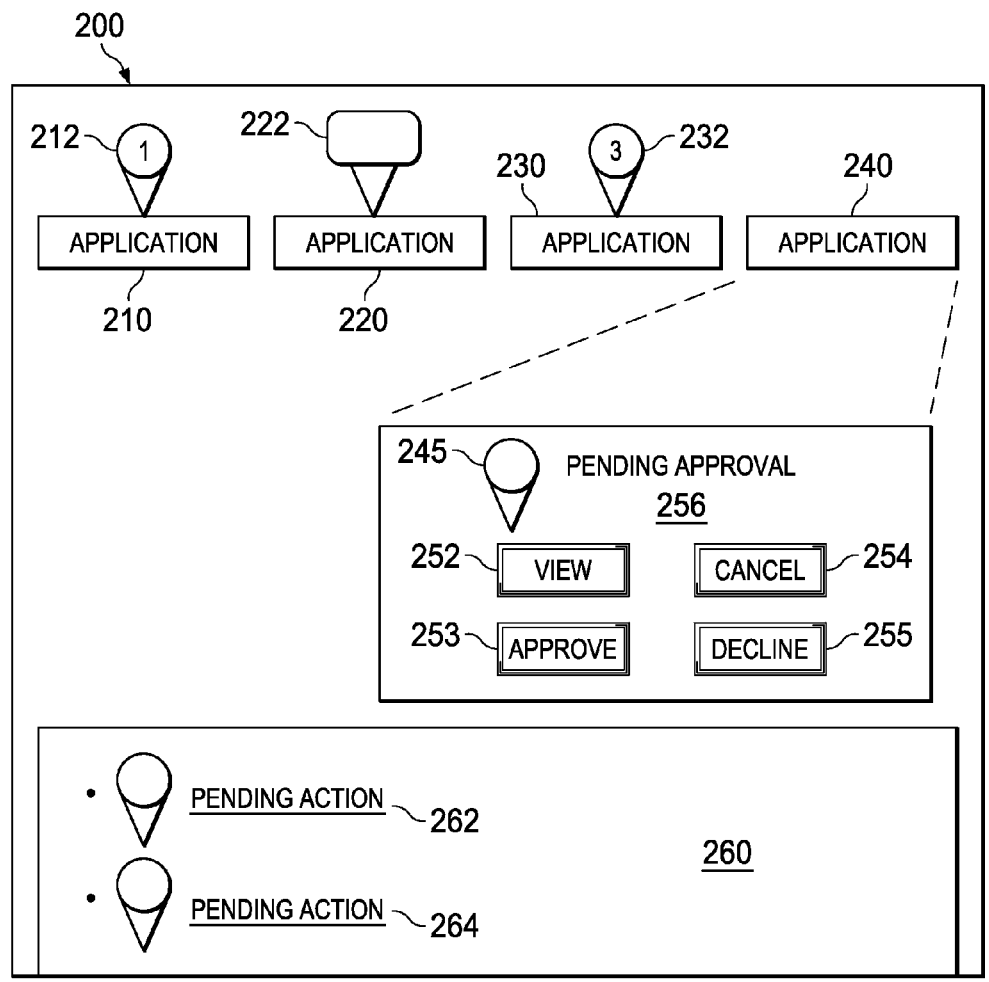
FIG. 2 illustrates an example user interface with action item notifications.

FIG. 2 illustrates an example user interface 200 with action item notifications. The example user interface 200 may be applicable to the GUI 190 as illustrated in FIG. 1. The example user interface 200 includes multiple business applications 210, 220, 230, and 240 represented by icons. The business applications 210, 220, 230, and 240 can be connected to a portal system using a background client web application accessing an enterprise portal (i.e., the user or the client device has signed on to the enterprise portal for communication). In some implementations, when the user opens the mobile device of the example user interface 200, the business applications 210, 220, 230, and 240 can be highlighted with various action item notification indications. For example, the business application 210 can be highlighted with a pop-up balloon 212 hovering over the icon. The notification associated with the business application 220 can include a pop-up dialog box 222 over the icon to show notification contents. The notification associated with the business application 230 can be included in an action item indication list 260 at the bottom of the page. The action item indication associated with the business application 240 can include a pop-up window 256 showing action item details. In some implementations, application notification events sent to the business applications 210, 220, 230, and 240 can include other action item indications, such as an SMS message, a calendar reminder, audio, video, or a combination of these features.

In some implementations, the pop-up balloon 212 can include texts or numbers indicating the number or importance of notifications. The pop-up balloon 212 may include links to the action item indication list 260, for example, in response to a user's selection of the pop-up balloon 212, the action item indication list 260 can be presented to the user to enable the user to interact with the related action item indications. The pop-up dialog box 222 can include the contents of the associated action item indication in a scaled down size. For example, the dialog box 222 can include detailed instructions, links (e.g., URL to launch the business application in a contextual environment), options to ignore or delay the action item, and other actions. In some implementations, the action item indication associated with the business application 230 can be simultaneously displayed as a pop-up balloon 232 and in the action item indication list 260.

The unified action item indication list 260 can include a list of pending action items 262 and 264. The pending action items 262 and 264 may be organized based on reception time, priority, deadline, or other criteria. User may define the presentation criteria in the unified action item indication list 260. The pending action items 262 and 264 can include a context overlaid link to launch the corresponding business application with a state to respond to the associated action item indications. For example, the pending action item 262 can include a detail description of a pending approval request with a context overlaid link to launch the business application 230. As the user selects the context overlaid link, the business application 230 can be launched with a page associated with the approval request. The page can display detailed information of the approval request. The user can have options to respond to the request, approve the request, decline the request, or respond at a different time.

The pop-up window 256 can show detailed action item indication information similar to the unified action item indication list 260 that jumps to the top of the example user interface 200 as a modal dialog requiring the user to respond immediately. For example, the pop-up window 256 can be used for high-priority applications that include time-sensitive materials. The pop-up window 256 can include action item descriptions and action item options, such as a view button 252 to launch the corresponding application and view the action item; an approve button 253 to approve the request and have the application launched in the background; a decline button 255 to decline the request and have the application launched in the background; and a cancel button 254 to close the pop-up window 256. Although some action item indication examples are illustrated in the example user interface 200, other action item indications including specific action items can be used. For example, the action item indication can include an audio message and receive audio instructions from the user. Other methods are possible.

FIG. 3 illustrates an example method 300 for receiving application notification event on a mobile device. The example method 300 can be applied to the client 175 as illustrated in FIG. 1.

At 305, a client device is connected with a portal system. For example, the client device can enable a user to sign onto a portal system using verified credentials to send and retrieve metadata about the user. From 305, method 300 proceeds to 310.

At 310, the user can select which data source to receive notifications events from. For example, the user may have multiple business applications on the client device and would want to receive application notification events for a subset of the multiple business applications. The user can select which business applications to receive application notification events from. From 310, method 300 proceeds to 320.

At 320, the client device receives application notification events from the selected data sources. From 320, method 300 proceeds to 330.

At 330, the received application notification events can generate action item indications on the user device. The action item indications can provide details associated with a particular action item including a URL to launch an application associated with the action item notification. In some implementations, the action item indication includes a pop-up balloon, an action item indication list, a pop-up window, an SMS message, a calendar reminder message, or other forms of indications. From 330, method 300 proceeds to 340.

At 340, the user can, in response to the action item indication, select and open the received action item indication to view the notification content. For example, the action item indication may be presented as a new item in a unified application notification event list. The user can open the new item to view detailed action item information, instructions, etc. For example, the user can review an action item instruction for the application associated with the action item indication. The action item instruction can include links to applications, web contents, and sources. From 340, method 300 proceeds to 350.

At 350, the user can select the action item instruction to launch the application and perform the action item noted in the action item indication. In some implementations, the application notification event includes a unified list of at least one determined action item applicable to a user and a particular client device associated with the user. From 350, method 300 stops.

FIG. 4 illustrates an example method 400 for providing application notification events from a portal system perspective. The example method 400 may be applicable to the portal system 103 as illustrated in FIG. 1.

At 410, a portal system can communicate with various sources and receive data from these sources. For example, the portal system can be connected with different business applications, of which users can generate requests and events to be processed by the portal system. The portal system can receive or retrieve requests or action items from the business applications. From 410, method 400 proceeds to 420.

At 420, the portal system receives user information. The user information can include metadata of the user, as well as configuration information of the user's client devices. From 420, method 400 proceeds to 430.

At 430, a portal system notification engine can determine an action item to perform with an application on the user's client device based on the received user information and the requests. From 430, method 400 proceeds to 440.

At 440, the notification engine can generate an application notification event including a unified list of action items that are determined based on the received information. The action items can include links to respond to the requests and detailed information about the requests. From 440, method 400 proceeds to 450.

At 450, the portal system transmits the application notification event to a client device. The client device may include its own notification manager to manage the list of unified application notification events. In some implementations, the application notification events can include suggestions to update/downgrade applications or install new applications. The suggestions can be provided by a service analyzing the role and other role-based parameters of the client device user. From 450, method 400 proceeds to 460.

At 460, the portal system can expose the notification feed to multiple client devices. Each of the multiple client devices can have their own notification manager to filter and select appropriate application notification events from the application notification event list. From 460, method 400 proceeds to 470.

At 470, indications of action items are generated at the client devices. The action item indications can be configured based on user preference and/or settings on the client device. From 470, method 400 proceeds to 480.

At 480, action item details can be provided to the user at launch of the applications associated with the application notification events. For example, the applications can be launched in a state highlighting or presenting actions items associated with the application notification events. From 480, method 400 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are illustrated as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program, by way of example, can be based on general or special purpose microprocessors or both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or track pad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A method comprising:
   receiving notification data from a plurality of data sources;
   determining, by a computer, based upon the received notification data, at least one action item to perform with an application on a client device;
   generating, by a computer notification engine, an application notification event, wherein the application notification event includes a unified list of at least one determined action item applicable to a user and the user's particular client device, the unified list including a context overlaid link corresponding to the at least one determined office action, the context overlaid link configured to launch an application applicable to respond to the at least one determined action item and in a state to respond to the at least one determined action item; and
   transmitting the generated application notification event to the client device.

2. The method of claim 1, further comprising processing a received application notification event to generate an indication of the at least one determined action item to be performed with the application, wherein the indication is displayed on a graphical user interface.

3. The method of claim 2, wherein generating the indication includes providing details associated with a particular action item of the at least one determined action item including a URL, wherein a selection of the URL launches the application.

4. The method of claim 1, wherein the generated indication includes at least one of a pop-up balloon, a dropdown list, or a pop-up window.

5. The method of claim 4, wherein the generated indication includes at least one of an SMS message, or a calendar reminder message.

6. The method of claim 4, wherein the generated indication includes at least one of audio or video.

7. The method of claim 1, further comprising exposing a particular user's notification feed to a plurality of client devices using various communication protocols, wherein each client device can process received application notification events according to client device specific parameters.

8. The method of claim 1, wherein the notification engine receives input from a suggestion service collecting data from other users having a similar profile as a particular user and the notification engine recommends to the particular user to use a particular application that the other users are using.

9. The method of claim 1, wherein the plurality of data sources are limited by selecting particular data sources from the plurality of data sources.

10. A computer-program product comprising computer-readable instructions embodied on tangible non-transitory media and operable when executed to:
    receive notification data from a plurality of data sources;
    determine, based upon the received notification data, at least one action item to perform with an application on a client device;
    generate an application notification event, wherein the application notification event includes a unified list of at least one determined action item applicable to a user and the user's particular client device, the unified list including a context overlaid link corresponding to the at least one determined office action, the context overlaid link configured to launch an application applicable to respond to the at least one determined action item and in a state to respond to the at least one determined action item; and
    transmit the generated application notification event to the client device.

11. The computer-program product of claim 10, further comprising computer-readable instructions embodied on tangible non-transitory media and operable when executed to process a received application notification event to generate an indication of the at least one determined action item to be performed with the application, wherein the indication is displayed on a graphical user interface.

12. The computer-program product of claim 11, further comprising computer-readable instructions embodied on tangible non-transitory media and operable when executed to generate the indication includes providing details associated with a particular action item of the at least one determined action item including a URL, wherein a selection of the URL launches the application.

13. The computer-program product of claim 10, wherein the generated indication includes at least one of a pop-up balloon, a dropdown list, or a pop-up window.

14. The computer-program product of claim 13, wherein the generated indication includes at least one of an SMS message, a calendar reminder message, an audio, or a video.

15. The computer-program product of claim 10, further comprising computer-readable instructions embodied on tangible non-transitory media and operable when executed to expose a particular user's notification feed to a plurality of client devices using various communication protocols, wherein each client device can process received application notification events according to client device specific parameters.

16. A system of one or more computers configured to perform operations comprising:
receiving notification data from a plurality of data sources;
determining, based upon the received notification data, at least one action item to perform with an application on a client device;
generating an application notification event, wherein the application notification event includes a unified list of at least one determined action item applicable to a user and the user's particular client device, the unified list including a context overlaid link corresponding to the at least one determined office action, the context overlaid link configured to launch an application applicable to respond to the at least one determined action item and in a state to respond to the at least one determined action item; and
transmitting the generated application notification event to the client device.

17. The system of claim 16, further comprising processing a received application notification event to generate an indication of the at least one determined action item to be performed with the application, wherein the indication is displayed on a graphical user interface.

18. The system of claim 17, wherein generating the indication includes providing details associated with a particular action item of the at least one determined action item including a URL, wherein a selection of the URL launches the application.

19. The system of claim 16, wherein the generated indication includes at least one of a pop-up balloon, a dropdown list, or a pop-up window.

20. The system of claim 19, wherein the generated indication includes at least one of an SMS message, a calendar reminder message, an audio, or a video.

* * * * *